March 9, 1965   C. W. HAWKEY ETAL   3,172,432
FILAMENT MOUNTING APPARATUS

Filed Aug. 11, 1961   3 Sheets-Sheet 1

INVENTORS
*CHARLES W. HAWKEY* and
*JAMES E. PETERSON.*
BY

*W. D. Palmer*
ATTORNEY.

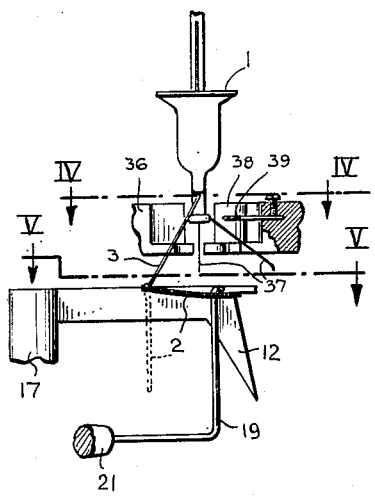
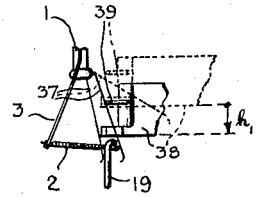
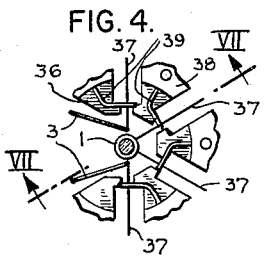
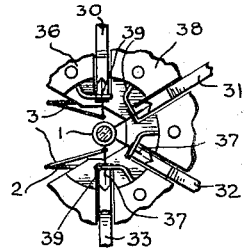
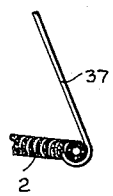
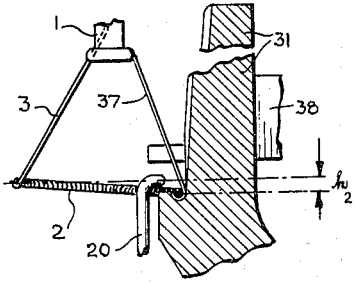
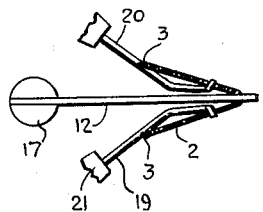
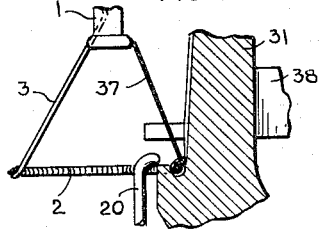
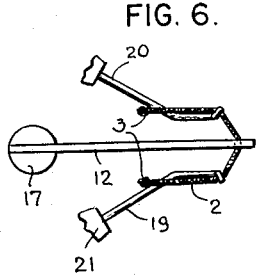

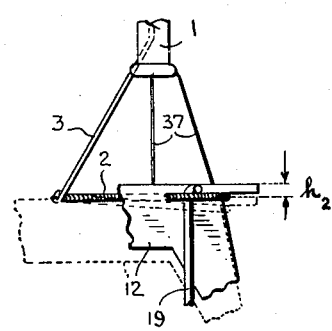
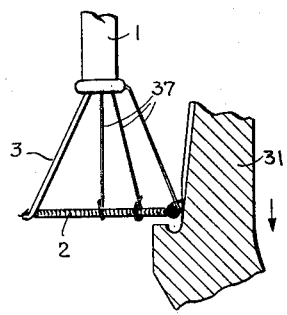
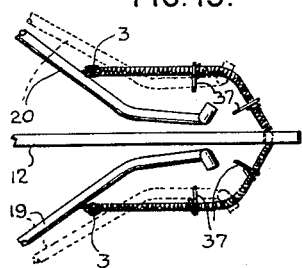
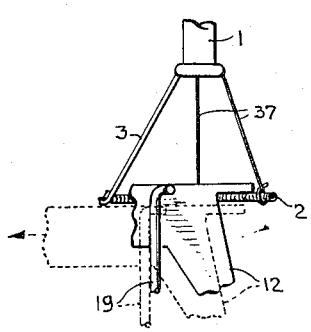
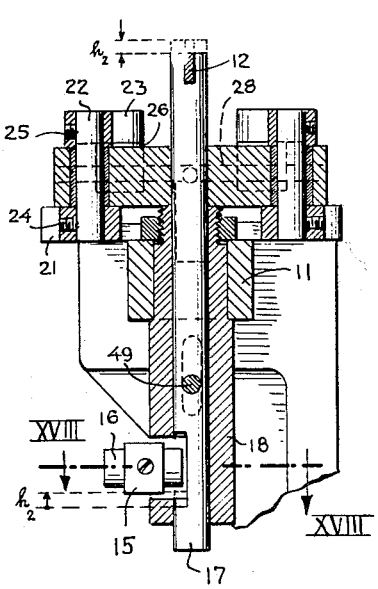
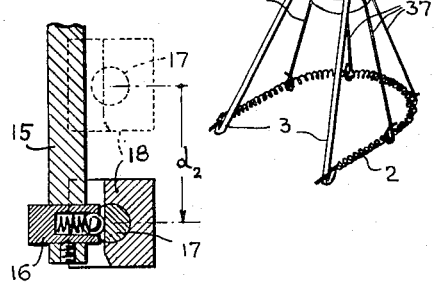

United States Patent Office 3,172,432
Patented Mar. 9, 1965

3,172,432
FILAMENT MOUNTING APPARATUS
Charles W. Hawkey, Caldwell, and James E. Peterson, Newark, N.J., assignors to Westinghouse Electric Corporation, East Pittsburgh, Pa., a corporation of Pennsylvania
Filed Aug. 11, 1961, Ser. No. 130,907
4 Claims. (Cl. 140—71.6)

This invention relates to apparatus for mounting filaments of electric incandescent lamps and particularly to apparatus for positioning, shaping and holding the filament without abrasion or strain while a plurality of support wires are curled at the end portions thereof about the filament and for withdrawing the filament positioning apparatus without abrasion or any further contact with the filament after the support wires have been thus fixed.

The object of the invention is to provide means to handle the filament gently to avoid abrasion or straining whereby injury to a delicate element in manufacture may be avoided. This object may be clarified by noting that on days of high humidity the coefficient of friction between a filament and the surface of an element over which it must slide increases and has, in some prior art devices, been a source of trouble leading to an unduly high number of rejections of defective articles.

The invention resides in means employed at a stage in the manufacture of electric incandescent lamps where a filament of a precisely predetermined length has been fixed to its lead-in wires and is dangling vertically downward therefrom and where it is now necessary to engage said filament, move it to a near horizontal position, then spread it to bring it into close contiguity to the ends of a plurality of support wires which are then curled about said filament. Such filaments are fragile so that any strain or abrasion thereof must be avoided. The invention therefore consists of a means for moving the means for positioning the said filament after the ends of said support wires have been curled thereabouts without abraiding or snagging said filament. Whereas such a retreat might be controlled conventionally by a train of gears and a plurality of cams, there is provided a very effective, simple and economical means which produces results equal to any such other more complicated mechanical contrivance.

In accordance with a feature of the invention, there is provided an element which may be called a filament positioner. This consists of a finger which is moved into contact with a dangling filament and which thereupon moves it into a near horizontal position, and a pair of spreaders which thereupon spread the filament into a sort of open loop with the filament positioned in close contiguity to the ends of a plurality of support wires. Another device now comes into play to curl the ends of the support wires about the filament. As the ends of the support wires become partially curled about the filament, this second device engages the first or filament positioner so that for the remainder of the vertically upward movement of the curling dies, the filament positioner also moves vertically upward to bring the filament from said near horizontal position to a completely horizontal position.

In accordance with this feature the filament positioner is now maintained in the position attained so that any gravitational or downward return movement thereof is inhibited. However, a machine-controlled horizontal retreat movement is not prevented so that when the fingers of the filament positioner are moved in retreat, the movement will be completely horizontal for a short distance, whereafter the filament positioner will drop vertically under the force of gravity and a stressed return spring. This effect is produced by a thrust bearing sometimes known as a ball stop effectively carried by the frame of the machine and held in contact with the said filament positioner when and as this positioner reaches the position in which the filament is moved into said near horizontal position and thereafter when the filament is moved upwardly into a completely horizontal position. Thus a potential force for moving the fingers of the filament positioner is stored in the filament positioner and is not released until this element is moved a short distance horizontally away.

Another feature of the invention resides in the use of a pair of elements substantially indepednent of each other, excepting that they both respond to the same driving power, constructed and arranged so that the second of such elements will engage the first near the end of its useful stroke and produce in the first an additional movement in a direction at right angles to its normal movement thereby storing in said first element a potential for a movement uncontrolled by the machine. This potential having been stored is maintained by pressure exerted against said first element until said first element has been machine controlled to move backwardly toward its starting position over a predetermined distance.

In accordance with a feature of the present invention, the said means to maintain said stored potential resides in a capsule mounted substantially on the frame of the machine and located so that the first said element, the filament positioner, comes under control of such capsule near the end of its machine controlled stroke. This capsule contains a spring pressed ball whereby any further movement of the said positioner is retarded or inhibited insufficiently to overcome further machine controlled movement, but sufficiently so that it will not respond to other forces, such, for instance, as a gravitational or a stressed return spring force.

Another feature of the invention is the use in a machine of a machine controlled element in which an additional movement controlled by natural forces is carried out after a potential for such natural movement has been built up by the machine controlled movement and then inhibited until said machine element thereafter has been machine controlled to move to another predetermined position. In accordance with this feature the said inhibiting means resides in a conventional piece of hardware generally known as a ball stop whereby the movement of the filament positioner is made to be generally rectangular, that is, horizontally, then vertically upward to the position where the support wires are curled about the filament, thereafter horizontally in a reverse direction and then vertically downward on its retreat to its normal or starting position.

Other features will appear hereafter.

The drawings consist of three sheets having nineteen figures, as follows:

FIG. 3 is a fragmentary enlarged view of the filament positioner after it has come into contact with the vertically dangling filament and moved it into a near horizontal position;

FIG. 4 is a sectional plan view on line IV—IV of FIG. 3, showing the jaws of the clamp for holding the filament support wires while the ends thereof are curled about the filament and showing the support wire wiping pins attached to said jaws which function to move said support wires into their predetermined positions in which they will be clamped;

FIG. 5 is a sectional plan view on line V—V showing the filament held in a near horizontal position, as in FIG.

Figure 1:
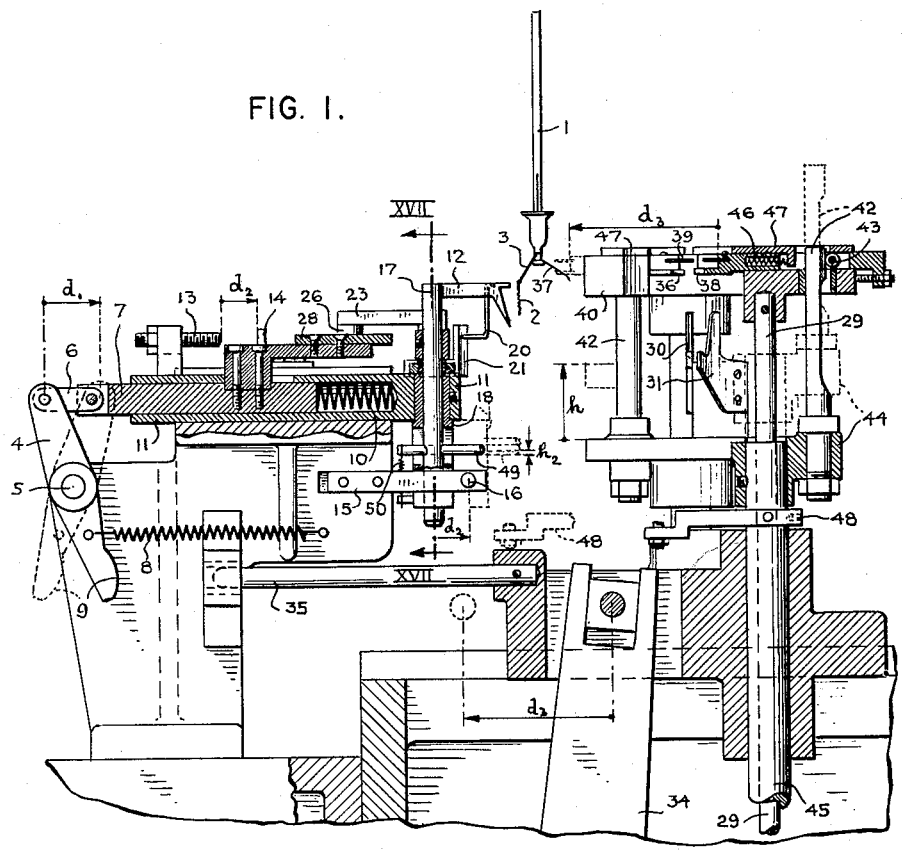
FIG. 1 is a vertical cross-sectional view on line I—I of FIG. 2 showing the filament positioner for support wire curling and the support wire curling die assembly in their starting positions before any operative movement in the cycle has taken place with a lamp mount just having been moved and secured into its operative position.

3, and ready to be spread into position where the ends of the support wires may be curled thereabouts;

FIG. 6 is the same as FIG. 5, but with the spreading fingers having been moved outwardly to spread the filament into the desired position prior to the downward movement of the clamp jaws;

FIG. 7 is a side elevation in the plane of the lamp mount indicated by the line VII—VII of FIG. 4, indicating how the filament support wires are brushed into cooperative relationship with the filament and how the ends of such support wires are positioned in the paths of the curling dies;

FIG. 8 is similar to FIG. 4, but with the clamp jaws moved downwardly, as in FIG. 7, and inwardly to clamp the filament support wires;

FIG. 9 is an enlarged fragmentary sectional view similar to FIG. 7 showing the engagement of the end of a filament support wire by a curling die by which the said end of a filament support wire is partially curled about the filament before it has been moved into a completely horizontal position;

FIG. 10 is a fragmentary and still further enlarged view of the end of the filament support wire, as shown in FIG. 9, indicating the end of such support wire partially curled about the filament;

FIG. 11 is the same as FIG. 9 except that the curling die and the filament spreaders have been bodily moved upwardly a distance indicated by the dimension $h_2$ in FIG. 9 to bring the filament into a strictly horizontal position and to further curl the end of the filament support wire about the filament, as indicated in FIG. 12;

FIG. 12 is a view similar to FIG. 10 showing the end of a filament support wire still further curled about the filament through the small upward movement of the filament spreaders and the coiling dies;

FIG. 13 is a fragmentary enlarged view of the filament positioner and the spreading fingers, also shown in FIG. 3, but in which such filament positioning means have been moved upwardly, as indicated in FIG. 11, where the filament has attained a horizontal position and the ends of the support wires have been curled about the filament in the position of the final product;

FIG. 14 is an enlarged fragmentary view similar to FIG. 11 showing the first step in the retreat of the filament fixing means which consists of a downward movement of the curling dies;

FIG. 15 is a view similar to FIG. 5 and FIG. 6 showing the second step in the retreat of the filament fixing means which consists of the movement of the spreaders from their FIG. 6 position back to their original FIG. 5 position;

FIG. 16 is a view similar to that of FIG. 13 showing a third step in the retreat of the filament fixing means which consists of a backward (to the left) movement of the filament positioner to allow a following downward movement thereof into its original position shown in FIG. 1;

FIG. 17 is a cross-sectional view of line XVII—XVII of FIG. 1 showing certain details of the mount for the filament positioner to indicate how the fingers of the filament positioner may be moved clear of the filament;

FIG. 18 is a minute detail fragmentary sketch, partly in section, taken on the line XVIII—XVIII in FIG. 17, showing the ball latching means employed to hold the filament positioner after it, as indicated in FIG. 1, has been moved to the right a distance $d_2$; and FIG. 19 is a fragmentary perspective view of a filament mount after the completed operational cycle of the machine during which the filament has been secured.

In the drawings, for the sake of clarity, many of the conventional operating means have been omitted since their provision and operation are well understood. By way of example, it will be readily understood that means is provided to grasp a lamp mount 1, with a precisely predetermined length of filament 2, dangling from the lead-in wires 3, to which it has been affixed in the position shown in FIG. 1, and to hold it immobile in this position during the ensuing operations. Likewise, the extent of movement of the various parts are indicated by dotted lines between which arrows extend, such as the arrow marked $d_1$, at the left end of FIG. 1, which indicates that the lever 4, pivoted to the frame of the machine at point 5 will, through a linkage 6, move the plunger 7 a distance equal to the dimension of $d_1$. Lever 4 is held in its normal position, as shown, under influence of a spring 8 until its cam face 9 is contacted by the rod 35 and driven toward the left by a conventional operating means consisting of a lever 34.

When the plunger 7 is impelled toward the right, it will, through the compression spring 10, move slide 11 toward the right and since this slide provides a mount for the finger 12, the filament 2 will be engaged and moved to the position shown in FIG. 3 and in FIG. 5. It is particularly to be noted that in FIGS. 3, 5 and 6 where the filament is positioned, it is at no time rendered taut so that it is not stretched or deformed.

The movement of the plunger 7 and the sleeve 11 is over the distance $d_2$, noted both in FIG. 1 and in FIG. 18 and this distance is measured between the adjustable screw 13 and the stop 14 so that when the end of this screw 13 contacts the stop 14 the slide 11 can move no further to the right. By the same token, a bar 15 secured to the frame of the machine has mounted at its extremity a capsule 16, sometimes known as a ball stop, containing a ball thrust outwardly by a spring, as shown in FIG. 18, to bear against the shaft 17 to which the finger 12 is affixed and which is housed within a square shaped mount 18 secured to the slide 11. The ball in the capsule 16 exerts enough pressure between the rod 15 and the mount 18 to prevent any relative movement therebetween.

The movement of the slide 11 and therefore of the finger 12 has engaged the filament 2 and lifted it into the position shown in FIG. 3 and in FIG. 5, wherein a pair of spreading fingers 19 and 20 come into cooperative relationship with the filament 2, as shown in FIG. 5.

The finger 19, by way of example, is fixed to an element 21, pivoted on the pin 22 and cooperatively secured to the arm 23 by set screws 24 and 25 so that the element 21 partakes of the movement of the arm 23. A roller 26 is mounted at the far end of the arm 23 and this rides in a slot 27 in the plate 28. Thus it will be seen that as the plunger 7 moves toward the right, the finger 19 will be cammed into a clockwise rotation. Therefore, after the plunger 7 together with the slide 11 has moved the distance $d_2$ toward the right, then the slide 11 stops further movement but the plunger 7 continues to move against the pressure of spring 10 a distance equal to $d_1-d_2$ whereby the movement of the cam plate 28 causes the spreading fingers 19 and 20 to move apart and to spread the filament into the configuration of FIG. 6.

Figure 2:
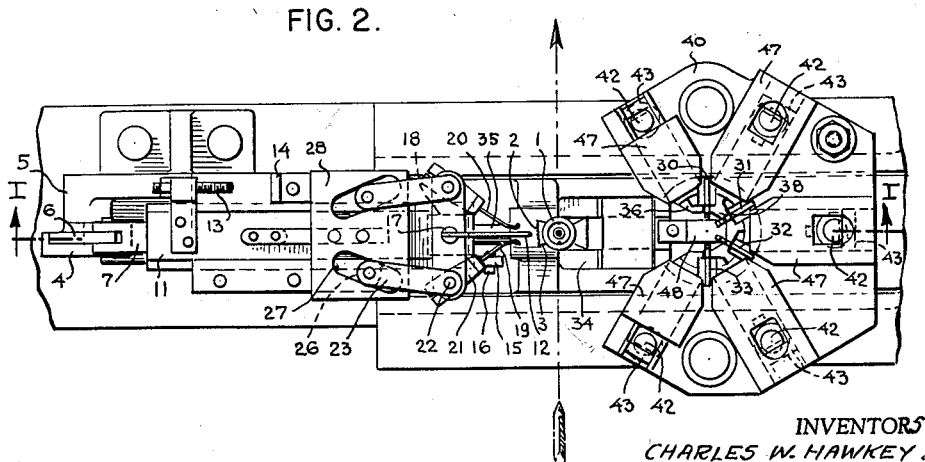
FIG. 2 is a plan view of the device of FIG. 1.

The mechanism at the right of FIG. 1, that generally associated with the shaft 29 may be denominated the curling die carrier since its principal function is to position the curling dies 30, 31, 32 and 33 and to then impart to them the upward movement by which they each engage the ends of support wires and curl same about the filament. Therefore it may be noted that the lever 34 which supplies part of the motive force for this mechanism, besides moving the rod 35 toward the left to contact the cam face 9 to bring the filament into the condition indicated in FIG. 6 also moves the curling die carrier toward the left by a distance $d_3$ which is sufficient to bring the filament into its FIG. 6 position as the jaws of the filament support wire clamps move into their operating positions. Thus clamp jaw 36, note FIG. 1, FIG. 2 and FIG. 4, comes into a position shown particularly in FIG. 4 wherein a filament support wire 37 is positioned between this jaw 36 and the next jaw 38.

There is a stiff brushing wire 39, indicated also in FIG. 1, which is now positioned above and across the support wire 37 so that when the clamp jaw support 40 is now lowered by the coordinated downward movement of the shaft 29, the support wire will be brushed downwardly into position between the jaws 36 and 38 just before these jaws close. It may be noted that jaws 36 and 38 are moved inwardly by a number of guide rods which are affixed to the body plate 44, attached to and movable by the sleeve 45.

Each of these guide rods is flattened so that as the support 40 is lowered, the jaws such as 36 and 38, which have rollers 43 bearing against the flattened surfaces of rods 42, are allowed to move inwardly under the driving force of a spring, such as the compression spring 46 associated with the jaw support plate 47. Thus, a coordinated downward movement of the shaft 29 after the lever 34 has completed its counter clockwise movement, lowers the support plate 40, brushes each of the support wires into place directly in the path of a curling die and then clamps them firmly in this position.

Now an upward coordinated movement of the sleeve 45 takes place over a distance $h$ wherein an arm 48, shown in full in FIG. 1 and also shown in broken lines at a distance $d_3$ towards the left, moves upwardly a distance $h$. This arm 48, near the end of its travel over the distance $h$ comes into contact with a pin 49 so as finally to lift the finger 12 and the spreaders 19 and 20 upward by a small amount $h_2$ which has the effect brought out in FIGS. 9 to 12. It is this last small upward movement $h_2$ which completes the curling of the support wires about the filament while preventing distortion of the filament. In explanation, as the filament curlers 30–33 are moved upwardly through the distance $h_2$ to complete the securing of the filament, the filament spreaders 19 and 20, the finger 12 and the filament are also moved upwardly a distance $h_2$ through lever 48 engaging the pin 49. Thus all mechanisms which position and support the filament are moved as one unit.

It may be noted that the ball bearing capsule 16 will hold the shaft 17 in its raised position even against the return pull of the spring 50 after the upward thrust of the arm 48 has been removed and until it will later appear that the return movement of the slide 11 has started and the ball at the end of capsule 16 leaves contact with the recessed surface of the bar 18 as can be seen in FIG. 18. Thus, the finger 12 and the spreaders 19 and 20 first move, as indicated in FIG. 16 to the left to get away from the filament before they drop downwardly below the level of the supported filament.

To go back now to the coordinated upward thrust of the sleeve 45, it may be noted that a number of curling dies 30 to 33 are affixed to the support 44 so that as this element moves upwardly these dies, shown in FIG. 1 in their normal position, will move upwardly, engage the ends of the support wires and curl them about the filament. It may further be noted that the faces of the dies which will contact the ends of the support wires are shaped as indicated in FIGS. 9, 11 and 14 so that the wire in curling will move at an angle to the plane of the die in order that the curl will resemble the loop of a spiral. Thus, the filament has been secured.

Thereafter, and by conventional coordinated means, the sleeve 45 is lowered to bring the curling dies away from the mounted filament, as indicated in FIG. 14, the shaft 29 is raised until the cam face of the rod 42 causes the support wire clam to release its hold on the support wires and thereafter the lever 34 is rotated in a clockwise direction. The first effect of this is to cause the cam plate 28 to retreat so that the filament spreaders 19 and 20 will move away from the filament, as indicated in FIG. 15. On a further retreating movement of the plunger 7, the slider 11 will be engaged and the finger 12 as well as the spreaders 19 and 20 will be moved away from the filament. When the element 18, as indicated in FIG. 18, moves from beneath the pressure of the ball in capsule 16, where neither the spreaders 19 and 20 nor the finger 12 can snag the filament, the shaft 17 drops downwardly and the position depicted in dotted lines in FIG. 16 is attained.

Thereafter the continued movement of the lever 34 returns all parts to their normal positions, as shown in FIG. 1, and the mounted filament depicted in FIG. 19 may be removed and another in the state shown in FIG. 1 may be placed in the machine ready for fixing.

It will be recognized that the object of the invention has been achieved by providing a filament mounting apparatus which will handle a filament very gently while affixing the filament to a stem by curling support wires about the filament.

While one best embodiment has been illustrated and described in detail, it is to be particularly understood that the invention is not limited thereto or thereby.

We claim:

1. Apparatus for positioning and securing a filament by means of support wires fixed to a lamp stem maintained on working station and which filament is secured at its extremities to lead-in wires fixed to such lamp stem with the unsecured filament portions dependent from such lead-in wires, said apparatus comprising, horizontal reciprocable actuating means for moving working parts of said apparatus from rest position to position proximate to said filament and said support wires, support wire clamping means responsive to initial movement of said horizontal reciprocable actuating means to move to position slightly above said support wires, finger means responsive to initial movement of said horizontal actuating means to contact the dependent portion of said filament and elevate same to a near horizontal position, spreader means responsive to further movement of said horizontal reciprocable actuating means to contact and spread said filament into position which approximates the desired final filament positioning, first vertical reciprocable actuating means, said clamping means responsive to movement of said first vertical reciprocable actuating means to move downwardly about and clamp said support wires in predetermined position proximate to said filament, second vertical reciprocable actuating means, support wire curling means responsive to initial movement of said second vertical reciprocable actuating means to bend the extremities of said support wires partially about proximate portions of said filament, locking means operatively connected to said finger means and said spreader means, further movement of said second vertical reciprocable actuating means further actuating said curling means to completely curl the extremities of said support wires about proximate filament portions and move said filament and said finger means and said spreader means into a substantially horizontal orientation where said locking means acts to hold said finger means and said spreader means in a substantially horizontal orientation, said curling means responsive to return motion of said second vertical reciprocable actuating means to move from operative position proximate to said now secured filament, said clamping means responsive to return motion of said first vertical reciprocal actuating means to release said clamped support wires and move to position above said support wires, said spreader means and said finger means and said clamping means responsive to initial return motion of said horizontal reciprocable actuating means to move from operative position proximate to said now secured filament, said locking means maintaining said finger means and said spreader means in a substantially horizontal orientation to avoid contact with said filament as said finger means and said spreader means are initially moved from operative position proximate to said now secured filament, said locking means responsive to further return movement of said horizontal reciprocable actuating means to release said finger means and said spreader means after sufficient horizontal return movement of said finger means and said spreader means to clear said filament, and further return movement of said horizontal reciprocable actuating means returning working parts comprising said apparatus to rest position to receive the next filament to be positioned and secured.

2. Apparatus for positioning and securing a filament by means of support wires fixed to a lamp stem maintained on working station and which filament is secured at its extremities to lead-in wires fixed to such lamp stem with the unsecured filament portions dependent from such lead-in wires, said apparatus comprising, finger means operable to contact the dependent portion of said filament and elevate same, spreader means operable to contact and spread said filament into position which approximates the desired final filament positioning, clamping means operable to clamp said support wires in predetermined position proximate to said filament, vertical reciprocable actuating means, support wire curling means responsive to initial movement of said vertical reciprocable actuating means to move toward said filament and said support wires and bend the extremities of said support wires partially about proximate portions of said filament, and further movement of said vertical reciprocable means further moving said curling means to completely curl the extremities of said support wires about proximate filament portions and secure said filament in final position while simultaneously moving said finger means and said spreader means an amount equivalent to such further movement of said curling means to minimize stresses on said filament.

3. Apparatus for positioning and securing a filament by means of support wires fixed to a lamp stem maintained on working station and which filament is secured at its extremities to lead-in wires fixed to such lamp stem with the unsecured filament portions dependent from such lead-in wires, said apparatus comprising, finger means operable to contact the dependent portion of said filament and elevate same, spreader means operable to contact and spread said filament into position which approximates the desired final filament positioning, vertical reciprocable actuating means, support wire curling means responsive to initial movement of said vertical reciprocable actuating means to move toward said filament and said support wires and bend the extremities of said support wires partially about proximate portions of said filament, and further movement of said vertical reciprocable means further moving said curling means to completely curl the extremities of said support wires about proximate filament portions and secure said filament in final position while simultaneously moving said finger means and said spreader means an amount equivalent to such further movement of said curling means to minimize stresses on said filament.

4. Apparatus for positioning and securing a filament by means of support wires fixed to a lamp stem maintained on working station and which filament is secured at its extremities to lead-in wires fixed to such lamp stem with the unsecured filament portions dependent from such lead-in wires, said apparatus comprising, horizontal reciprocable actuating means for moving working parts of said apparatus from rest position to position proximate to said filament and said support wires, finger means responsive to initial movement of said horizontal actuating means to contact the dependent portion of said filament and elevate same to a near horizontal position, spreader means responsive to further movement of said horizontal reciprocable actuating means to contact and spread said filament into position which approximates the desired final filament positioning, vertical reciprocable actuating means, support wire curling means responsive to initial movement of said vertical reciprocable actuating means to bend the extremities of said support wires partially about proximate portions of said filament, locking means operatively connected to said finger means and said spreader means, further movement of said vertical reciprocable actuating means further actuating said curling means to completely curl the extremities of said support wires about proximate filament portions and simultaneously move said filament and said finger means and said spreader means into a substantially horizontal orientation where said locking means acts to hold said finger means and said spreader means in a substantially horizontal orientation, said curling means responsive to return motion of said vertical reciprocable actuating means to move from operative position proximate to said now secured filament, said spreader means and said finger means responsive to initial return motion of said horizontal reciprocable actuating means to move away from operative position proximate to said now secured filament, said locking means maintaining said finger means and said spreader means in a substantially horizontal orientation to avoid contact with said filament as said finger means and said spreader means are initially moved from operative position proximate to said now secured filament, said locking means responsive to further return movement of said horizontal reciprocable actuating means to release said finger means and said spreader means after sufficient horizontal return movement of said finger means and said spreader means to clear said filament, and further return movement of said horizontal reciprocable actuating means returning working parts comprising said apparatus to rest position to receive the next filament to be positioned and secured.

References Cited in the file of this patent

UNITED STATES PATENTS

| | | |
|---|---|---|
| 1,907,533 | Flaws | May 9, 1933 |
| 2,811,988 | Hamilton | Nov. 5, 1957 |
| 2,841,189 | Meckstroth et al. | July 1, 1958 |